(12) United States Patent
Blair et al.

(10) Patent No.: US 7,865,172 B2
(45) Date of Patent: Jan. 4, 2011

(54) METHOD AND APPARATUS FOR DATA PROTECTION FOR MOBILE DEVICES

(75) Inventors: Colin Blair, Westleigh (AU); Kevin Chan, Ryde (AU); Christopher Reon Gentle, Gladesville (AU); Neil Hepworth, Artarmon (AU); Andrew W. Lang, Epping (AU)

(73) Assignee: Avaya Inc., Basking Ridge, NJ (US)

( * ) Notice: Subject to any disclaimer, the term of this patent is extended or adjusted under 35 U.S.C. 154(b) by 1013 days.

(21) Appl. No.: 11/471,192

(22) Filed: Jun. 20, 2006

(65) Prior Publication Data

US 2007/0294529 A1 Dec. 20, 2007

(51) Int. Cl.
*H04M 1/66* (2006.01)
*H04M 1/68* (2006.01)
*H04M 3/16* (2006.01)

(52) U.S. Cl. .............. 455/411; 455/26.1; 455/410; 380/30; 380/247; 380/255; 380/270; 726/26

(58) Field of Classification Search ......... 455/410–411, 455/418–419, 412.1, 26.1; 380/30, 247, 380/255, 270; 726/26
See application file for complete search history.

(56) References Cited

U.S. PATENT DOCUMENTS

| | | | |
|---|---|---|---|
| 2005/0228994 A1* | 10/2005 | Kasai et al. | 713/168 |
| 2006/0080551 A1* | 4/2006 | Mantyjarvi et al. | 713/186 |
| 2006/0258333 A1* | 11/2006 | Yang et al. | 455/412.1 |
| 2007/0021112 A1* | 1/2007 | Byrne et al. | 455/419 |
| 2007/0136593 A1* | 6/2007 | Plavcan et al. | 713/172 |

* cited by examiner

*Primary Examiner*—Nick Corsaro
*Assistant Examiner*—Munsoon Choo
(74) *Attorney, Agent, or Firm*—John C. Moran

(57) ABSTRACT

A method and apparatus protect data stored in a device by storing data from the device on a backup system upon the device being connected to the backup system; detecting that the device has been lost or stolen; encrypting a set of data stored on the device that has not been stored on the backup system using an encryption key based on another set of data stored on the device and also stored on the backup system; and deleting the other set of data and encryption key from the device.

18 Claims, 6 Drawing Sheets

METHOD AND APPARATUS FOR DATA PROTECTION FOR MOBILE DEVICES

TECHNICAL FIELD

The invention relates to the protection of data stored in a mobile device upon the device being stolen or lost.

BACKGROUND OF THE INVENTION

Within the prior art, a problem arises with respect to mobile devices such as laptop computers, mobile telephones, personal digital assistants, MP3 audio/data units, etc. The problem is that the amount of data that can now be stored on these devices can easily exceed 50 GB. Users are increasingly storing large amounts of confidential and sensitive data on such devices. In an event of theft or loss, this data can be used to detriment of companies and government agencies, as well as the problem of misuse of personal data. There have been many examples of such loss. One example was the loss of a laptop computer which had the salaries, pension plan totals and social security numbers of all of the employees of a major corporation in the United States.

One prior art solution for resolving this problem is to force a user to enter a password or PIN every time they want to use the device. Not only is this inconvenient for the user, but short passwords and PINs can be determined utilizing automated systems that try all possibilities. In addition, passwords or PINs that have a large number of characters are extremely inconvenient for users to utilize.

A similar prior art solution is to encrypt the confidential data on the mobile device. This suffers from the problem as it requires an encryption key to be entered every time the device is used. The main disadvantage of encryption is that the difficulty it; breaking the encryption method is determined by the size of the key that is used to do the encryption. The smaller the key the easier the breaking of the encryption method is.

Another method for securing mobile devices is to use biometric techniques. One such biometric technique is to require the fingerprint of the user. The problem with biometric techniques is the cost of providing such techniques on a mobile device.

Another prior art solution is to delete all data on the mobile device once it is detected as being stolen. There are various techniques for determining if a mobile device has been stolen, one is to require that the mobile device automatically report to a central server periodically or when it accesses the Internet or a cellular network. The central server then can delete all of the data on the mobile device.

SUMMARY OF THE INVENTION

A method and apparatus protect data stored in a device by storing data from the device on a backup system upon the device being connected to the backup system; detecting that the device has been lost or stolen; encrypting a set of data stored on the device that has not been stored on the backup system using an encryption key based on another set of data stored on the device and also stored on the backup system; and deleting the other set of data and encryption key from the device.

DETAILED DESCRIPTION

Figure 1:
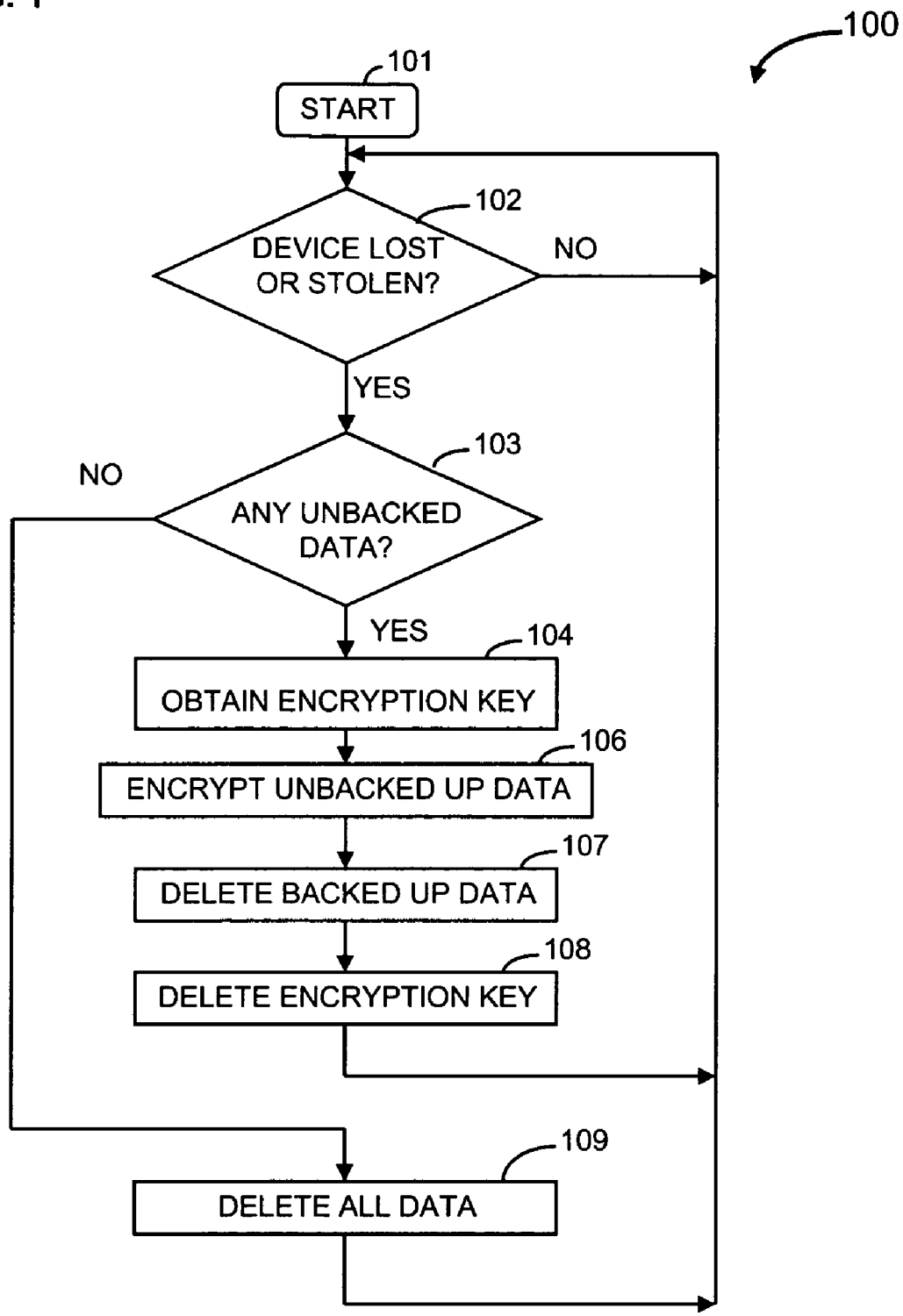
FIG. 1 illustrates, in flowchart form, operations 100 performed by an embodiment.

In one embodiment, a mobile device upon detection that it had been lost or stolen deletes all data on the device except for any data that had been added to the device but had not yet been backed up to a backup system such as server or personal computer. Before the backed up data is deleted, it is used to generate a large encryption key. This key can then be used to encrypt the non-backed up data. The encryption key would be so large that it would make it virtually impossible to break the encryption method. If the device was not lost or stolen but merely neglected or unused for a period of time, this embodiment has the advantage that backed up and non-backed up data can be retrieved using information stored on the backup system.

Once the mobile device is recovered, the encryption key can be generated from data backed up on the backup server or personal computer to create the encryption key again. Using this encryption key, the non-backed up data is then recovered and resynchronized with the backup server or personal computer. This embodiment assures that the non-backed up data is not lost while also ensuring that the encryption key generated is large enough to make it virtually impossible for the encryption method to be broken. In an alternative embodiment, the backup system generates the encryption key every time the mobile device is synched to the backup system and stores this key within the mobile device. When it is detected that the mobile device has been lost or stolen, the stored encryption key is utilized to encrypt all of the non-backed up data before deleting the backed up data and the encryption key.

In one embodiment, the device is determined to have been stolen or lost when the password or PIN is incorrectly entered a predefined number of times. Upon this detection occurring, the backed up data will be deleted and the non-backed up data will be encrypted as outlined in the previous paragraphs. In another embodiment, the device is determined to have been stolen or lost by doing gait analysis utilizing motion sensors within the mobile device to determine that the mobile device is now being carried by a person walking who is not the assigned user of the mobile device.

In yet another embodiment, the mobile device would have to periodically make contact with a central system via the Internet or some other wide area network or the mobile telephone network. If the periodic connection was not made then the steps of deleting the backed-up data and encrypting the non-backed up data, as outlined in the previous paragraphs, would be performed.

Also in another embodiment, the mobile device may have to periodically make contact with a specified other device via a wireless or wired connection such as for example a specified Bluetooth enabled device. Such a device could be but is not limited to a printer, headset, personal computer, PDA, etc.

Alternatively in this embodiment, the mobile device may have to periodically make contact with specified wireless or wired network such as for example but not limited to a 801.11 wireless network in a home, institution, coffee shop, office location, etc.

One skilled in the art could envision other techniques for determining that a device had been lost or stolen.

FIG. 1 illustrates, in flowchart form, operations 100 that are performed to protect data in a mobile device. After being started in block 101, decision block 102 determines if the device has been lost or stolen. If the answer is no, decision block 102 is re-executed. If the answer is yes in decision block 102, decision block 103 determines if there is any non-backed up data. Non-backed up data would be data that is not on the backup system for the device. If the answer is no in decision block 103, control is transferred to block 109 which deletes all data within the device before returning control back to decision block 102.

If the answer in decision block 103 is yes, block 104 obtains the encryption key. The encryption key will be based on the backed up data. The device may generate this encryption key based on the backed up data when block 104 is executed or the encryption key may have been stored in the device during the last time that data was backed up to the backup system. Block 106 encrypts the non-backed up data using the obtained encryption key. Block 107 deletes the backed up data, and block 108 deletes the encryption key before returning control back to decision block 102.

The determination performed by decision block 102 could be made by detecting that the incorrect password or PIN had been continuously entered more then a predefined number of times. Other methods for making this determination are discussed with respect to FIGS. 3 and 5.

Figure 2:
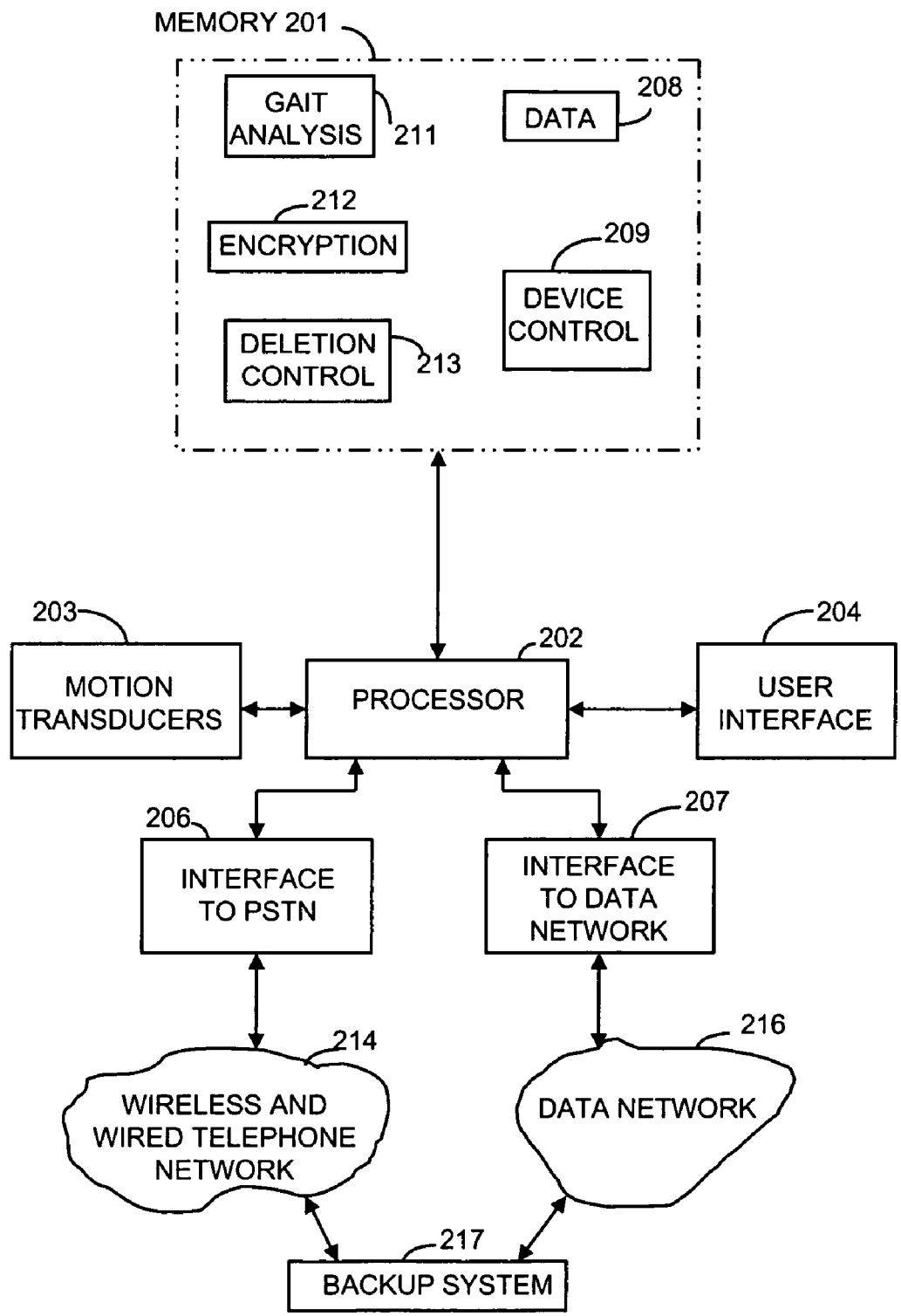
FIG. 2 illustrates, in block diagram form, an embodiment that utilizes gait analysis.

FIG. 2 illustrates, in block diagram form, an embodiment of a mobile device. The mobile device could be a laptop, mobile telephone, personal digital assistant, etc. Processor 202 performs all control functions utilizing data and programs stored in memory 201. User interface 204 includes output means so that processor 202 could display information to a user such as a liquid crystal display or CRT. In addition, user interface 204 includes input means such as a keyboard, writing input, touch screen capabilities, buttons, etc. Interface 206 provides an interface to public switching telephone network 216 either via wired or wireless connections. Interface 207 provides an interface to data network 216 which may be the Internet or any other data network. Backup system 217 may be interconnected to the device via PSTN 214 or data network 216. Motion transducers 203 are utilized by gait analysis module 211 to identify the gait of the person carrying the device illustrated in FIG. 2.

Device control 209 performs the normal mobile device functions utilizing inputs from user interface 204 and interfaces 206 and 207 as well as data stored in data 208.

Processor 202 periodically executes gait analysis module 211 to identify the gait of the individual carrying the mobile device. The functions performed by gait analysis module 211 are set forth in greater detail in United States Patent Application Publication No. 2006/0080551 A1. This patent application publication is hereby incorporated by reference.

Once it has been determined that a different user is walking with the mobile device by execution of gait analysis module 211, processor 202 performs the operations illustrated in FIG. 1. By executing deletion control module 213, processor 202 determines what data in data 208 has not been backed up since the last synchronization with the backup system. Processor 202 then executes encryption module 212 to generate the encryption key and to encrypt the non-backed up data in data 208. After this has been done, processor 202 continues to execute deletion control 213 to remove all of the backed up data from 208 as well as the encryption key. Note, in one embodiment, encryption module 212 generates the encryption key based on the backed up data stored in data 208; whereas, in another embodiment the encryption key is already stored in data 208 having been previously stored there by the backup system.

Figure 3:
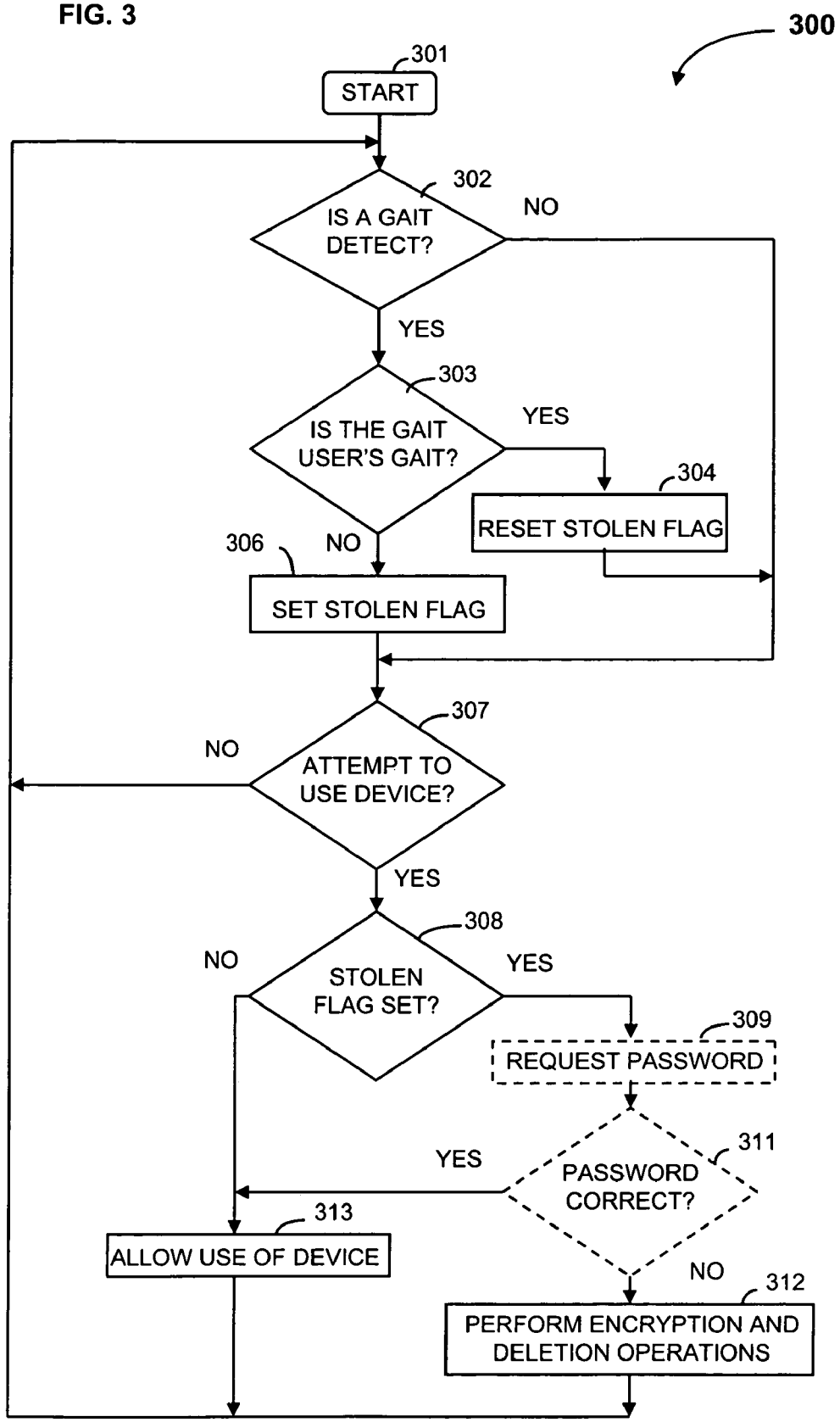
FIG. 3 illustrates, in flowchart form, operations that are performed in relation to the gait analysis.

FIG. 3 illustrates in greater detail the operations performed by processor 202 in executing gait analysis module 211, encryption module 212, and deletion control module 213 of FIG. 2. After being started in block 301, decision block 302 determines if a gait has been detected. If the answer is no, control is transferred to decision block 307.

If the answer in decision block 302 is yes, decision block 303 determines if the detected gait is the gait of the device's user. If the answer is yes, block 304 resets the stolen flag if it had been set before transferring control to decision block 307. If the answer in decision block 303 is no, block 306 sets the stolen flag before transferring control to decision block 307.

Decision block 307 determines if there is an attempt to use the device. If the answer is no, control is transferred back to decision block 302. If the answer is yes in decision block 307, decision block 308 determines if the stolen flag is set. If the answer is no, block 313 allows use of the device before returning control to decision block 302.

If the answer in decision block 308 is yes, in one embodiment block 309 requests the password from the individual attempting to use the device. It is envisioned that this password would be a very complex and lengthy password. After receiving the requested password, decision block 311 determines if the password is correct. One skilled in the art would readily see that blocks 309 and 311 could be executed a pre-defined number of times before it was determined that the password was not correct. If the answer in decision block 311 is yes, block 313 is executed. If the answer in decision block 311 is no, block 312 then performs the encryption and deletion operations as previously described.

In another embodiment, blocks 309 and 311 are not present and a yes answer in decision block 308 immediately results in the execution of block 312. After block 312 has performed the necessary operations, control is transferred back to decision block 302.

Figure 4:
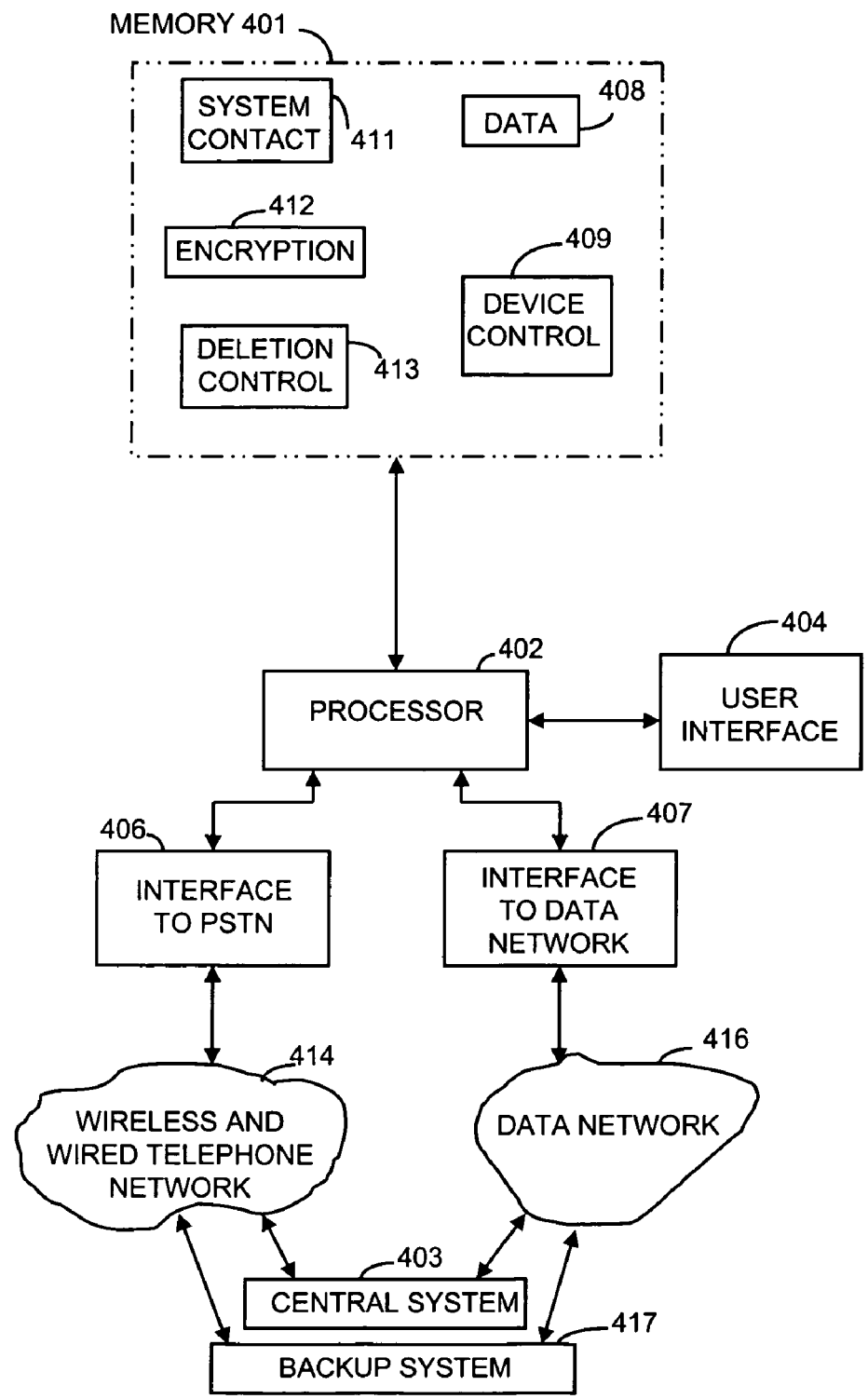
FIG. 4 illustrates, in block diagram form, an embodiment for utilizing the system contact operation to determine a lost or stolen mobile device.

FIG. 4 illustrates, in block diagram form, another embodiment. Blocks 404, 406, 407, 408, 409, 412, and 413 perform similar functions to those performed by like numbered blocks on FIG. 2. Processor 402 may interconnect to back up system 417 via wired telephone network 414 or data network 416.

Periodically, processor 402 by execution of system contact module 411 attempts to contact central system 403 via wireless and wired telephone network 414 or data network 416. If after a predetermined amount of time, and contact has not been made, processor 402 will execute encryption module 412 and deletion control module 413 to delete all backed up data and to encrypt the non-backed up data contained in data 408. Further details on the operation of processor 402 when executing system contact module 411 are given in FIG. 5.

Figure 5:
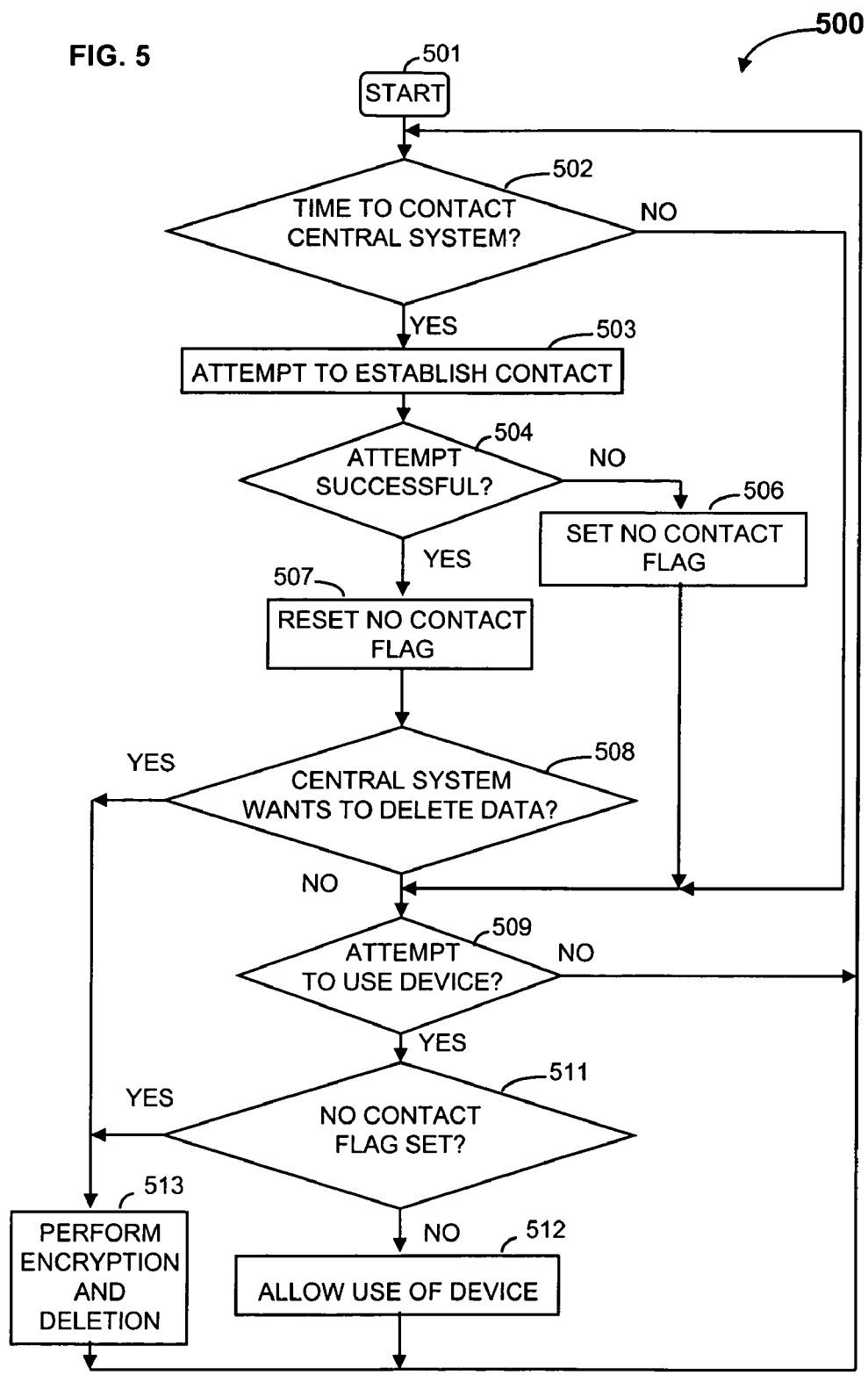
FIG. 5 illustrates, in flowchart form, operations 500 that are performed by the embodiment illustrated in FIG. 4.

FIG. 5 illustrates, in flowchart form, operations 500 that are performed by processor 402 during the execution of system contact module 411, encryption module 412, and deletion control module 413. After being started in block 501, decision block 502 determines if it is time to check with the central system. This time would occur periodically. If the answer is no, control is transferred to decision block 509.

If the decision in decision block 502 is yes, block 503 attempts to establish contact with the central system. Decision block 504 determines if the attempt was successful. If the answer in decision block 504 is no, block 506 sets the no-contact flag and transfers control to decision block 509.

If the answer in decision block 504 is yes, block 507 resets the no-contact flag, if it was set, before transferring control to decision block 508. Decision block 508 determines if the central system wants to delete data. If the answer is yes, control is transferred to block 513 that performs the encryption and deletion operations that were previously described, before returning control back to decision block 502.

If the answer in decision block 508 is no, decision block 509 determines if there is an attempt to use the device. If the answer is no, control is transferred back to decision block 502.

If the answer is yes in decision block 509, decision block 511 determines if the contact flag is set. If the answer is yes, control is transferred to block 513. If the answer in decision block 511 is no, block 512 allows the use of the device before transferring control back to decision block 502.

Figure 6:
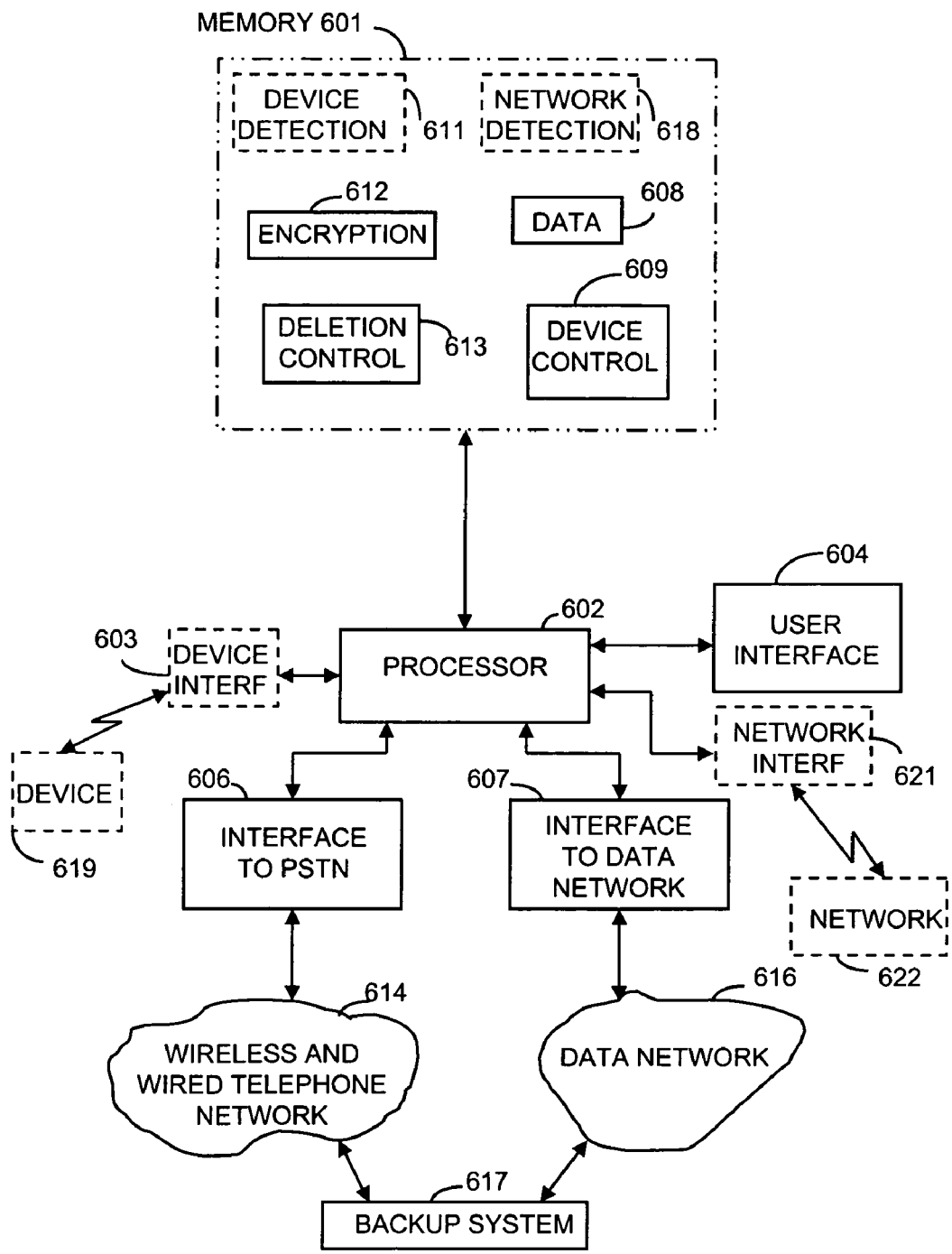
FIG. 6 illustrates, in block diagram form, another embodiment for determining a lost or stolen mobile device.

FIG. 6 illustrates, in block diagram form, Two embodiments of a mobile device that can detect if it has been lost or stolen. Processor 602 performs all control functions utilizing data and programs stored in memory 601. User interface 604 includes output means so that processor 602 could display information to a user such as a liquid crystal display or CRT. In addition, user interface 604 includes input means such as a keyboard, writing input, touch screen capabilities, buttons, etc. Interface 606 provides an interface to public switching telephone network 616 either via wired or wireless connections. Interface 607 provides an interface to data network 616 which may be the Internet or any other data network. Backup system 617 may be interconnected to the device via PSTN 614 or data network 616. In one embodiment of FIG. 6, device interface 603 provides a wireless or wired connection to device 619 which could be but is not limited to a printer, headset, personal computer, PDA, etc. In a second embodiment of FIG. 6, network interface 621 provides a wireless or wired connection to network 622.

Device control 609 performs the normal mobile device functions utilizing inputs from user interface 604 and interfaces 606 and 607 as well as data stored in data 608.

In the first embodiment of FIG. 6, processor 602 periodically executes device detection module 611 to establish communication with device 619. If communication can not be established with device 619 within a predefined period of time, processor 602 performs the operations illustrated in FIG. 1.

In the second embodiment of FIG. 6, processor 602 periodically executes network detection module 611 to establish communication with network 622. If communication can not be established with network 622 within a predefined period of time, processor 602 performs the operations illustrated in FIG. 1.

Processor 602 performs the following operations of FIG. 1. By executing deletion control module 613, processor 602 determines what data in data 608 has not been backed up since the last synchronization with the backup system. Processor 602 then executes encryption module 612 to generate the encryption key and to encrypt the non-backed up data in data 608. After this has been done, processor 602 continues to execute deletion control 613 to remove all of the backed up data from 608 as well as the encryption key. Note, in one embodiment, encryption module 612 generates the encryption key based on the backed up data stored in data 608; whereas, in another embodiment the encryption key is already stored in data 608 having been previously stored there by the backup system.

When the operations of a device, computer, processor or server are implemented in software, it should be noted that the software can be stored on any computer-readable medium for use by or in connection with any computer related system or method. In the context of this document, a computer-readable medium is an electronic, magnetic, optical, or other physical device or means that can contain or store a computer program for use by or in connection with a computer related system or method. The device, computer, processor or server can be embodied in any computer-readable medium for use by or in connection with an instruction execution system, apparatus, or device such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. For example, the computer-readable medium can be, but is not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, for instance, via optical scanning of the paper or other medium, then compiled, interpreted or otherwise processed in a suitable manner if necessary, and then stored in a computer memory.

In an alternative embodiment, where the device, computer or server is implemented in hardware, the device, computer or server can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Of course, various changes and modifications to the illustrated embodiments described above will be apparent to those skilled in the art. These changes and modifications can be made without departing from the spirit and scope of the invention and without diminishing its intending advantages. It is therefore intended that such changes and modifications be covered by the following claims except insofar as limited by the prior art.

What is claimed is:

1. A method for protecting data stored in a device, comprising:
    backing up data by the device to a backup system upon the device being connected to the backup system;
    detecting by the device that the device has been lost or stolen;
    generating by the device an encryption key from the backed up data upon the detection that the device has been lost or stolen;
    encrypting by the device non-backed up data stored on the device that has not been stored on the backup system using the generated encryption key; and deleting by the device the backed up data and the encryption key from the device with the encrypted non-backed up data remaining stored on the device for later recovery by the backup system.

2. The method of claim 1 further comprises re-connecting the device to the backup system;
re-generating the encryption key by the backup system from the backed up data stored on the backup system; and
recovering by the backup system the encrypted non-backed up data stored on the device by decrypting using the re-generated encryption key.

3. The method of claim 1 wherein the detecting comprises determining a gait of an individual carrying the device; and
indicating that the device has been lost or stolen upon the determined gait being different from an user of the device.

4. The method of claim 3 wherein the indicating comprises requesting a password or personal identification number upon the gait not being that of the user of the device; and
giving no indication of the device being lost or stolen if the password or personal identification number is correct.

5. The method of claim 1 wherein the detecting comprises determining that the device has not contacted a central system.

6. The method of claim 5 wherein the deleting further comprises allowing the central system to determine whether to delete the data.

7. The method of claim 1 wherein the detecting comprises determining that an incorrect password or personal identification number was incorrectly entered in response to a prompt to enter a password or personal identification number.

8. The method of claim 1 wherein the detecting comprises determining that the device has not periodically connected to a specified device within a predefined period of time.

9. The method of claim 1 wherein the detecting comprises determining that the device has not periodically connected to a specified network within a predefined period of time.

10. A non-transitory processor-readable medium for protecting data stored in a device, comprising processor-executable instructions configured for:
backing up data by processor-executable instructions on the device to a backup system upon the device being connected to the backup system;
detecting by processor-executable instructions on the device that the device has been lost or stolen;
generating by processor-executable instructions on the device an encryption key from the backed up data upon the detection that the device has been lost or stolen;
encrypting by processor-executable instructions on the device a non-backed up data stored on the device that has not been stored on the backup system using the generated encryption key; and
deleting by processor-executable instructions on the device the backed up data and the encryption key from the device with the encrypted non-backed up data remaining stored on the device for later recovery by the backup system.

11. The processor-readable medium of claim 10 further comprises processor-executable instructions for re-connecting the device to the backup system;
processor-executable instructions stored on the backup system for re-generating the encryption key from the backed up data stored on the backup system; and
processor-executable instructions stored on the backup system for recovering the encrypted non-backed up data stored on the device by decrypting using the re-generated encryption key.

12. The processor-readable medium of claim 10 wherein the processor-executable instructions for detecting comprise processor-executable instructions for determining a gait of an individual carrying the device; and
processor-executable instructions for indicating that the device has been lost or stolen upon the determined gait being different from an user of the device.

13. The processor-readable medium of claim 12 wherein the processor-executable instructions for indicating comprise processor-executable instructions for requesting a password or personal identification number upon the gait not being that of the user of the device; and
processor-executable instructions for giving no indication of the device being lost or stolen if the password or personal identification number is correct.

14. The processor-readable medium of claim 10 wherein the processor-executable instructions for detecting comprise processor-executable instructions for determining that the device has not contacted a central system.

15. The processor-readable medium of claim 14 wherein the processor-executable instructions for deleting further comprise processor-executable instructions for allowing the central system to determine whether to delete the data.

16. The processor-readable medium of claim 10 wherein the processor-executable instructions for detecting comprise processor-executable instructions for determining that an incorrect password or personal identification number was incorrectly entered in response to a prompt to enter a password or personal identification number.

17. The processor-readable medium of claim 10 wherein the processor-executable instructions for detecting comprise processor-executable instructions for determining that the device has not periodically connected to a specified device within a predefined period of time.

18. The processor-readable medium of claim 10 wherein the processor-executable instructions for detecting comprise processor-executable instructions for determining that the device has not periodically connected to a specified network within a predefined period of time.

* * * * *